US012718988B2

(12) United States Patent
Allam et al.

(10) Patent No.: US 12,718,988 B2
(45) Date of Patent: Aug. 25, 2026

(54) SELF-REGENERATIVE ELECTROLYTES WITH INTRINSIC REDOX ACTIVITY FOR ENERGY STORAGE DEVICES

(71) Applicant: The American University in Cairo, Cairo (EG)

(72) Inventors: Nageh K. Allam, New Cairo (EG); Abdelrahman A. M. Ismail, Sidi Salem (EG)

(73) Assignee: THE AMERICAN UNIVERSITY IN CAIRO, Cairo (EG)

( * ) Notice: Subject to any disclaimer, the term of this patent is extended or adjusted under 35 U.S.C. 154(b) by 201 days.

(21) Appl. No.: 18/590,263

(22) Filed: Feb. 28, 2024

(65) Prior Publication Data

US 2024/0290552 A1 Aug. 29, 2024

Related U.S. Application Data

(60) Provisional application No. 63/449,007, filed on Feb. 28, 2023.

(51) Int. Cl.

| | |
|---|---|
| ***H01G 9/22*** | (2013.01) |
| ***H01G 9/00*** | (2006.01) |
| ***H01G 9/025*** | (2006.01) |
| ***H01G 9/042*** | (2006.01) |

(52) U.S. Cl.
CPC ............. *H01G 9/22* (2013.01); *H01G 9/0036* (2013.01); *H01G 9/025* (2013.01); *H01G 9/042* (2013.01)

(58) Field of Classification Search
CPC ........ H01G 9/22; H01G 9/0036; H01G 9/025; H01G 9/042; H01G 11/02; H01G 11/06; H01G 11/84; H01G 11/56
See application file for complete search history.

(56) References Cited

U.S. PATENT DOCUMENTS

2013/0189592 A1* 7/2013 Roumi ................ H01M 8/0247 429/405
2024/0290552 A1* 8/2024 Allam .................... H01G 9/042

FOREIGN PATENT DOCUMENTS

| | | | | |
|---|---|---|---|---|
| CN | 108962628 A | * 12/2018 | H01G 11/84 |
| CN | 110323074 A | * 10/2019 | H01G 11/36 |
| CN | 114614112 A | * 6/2022 | H01M 10/38 |
| CN | 116266506 A | * 6/2023 | H01G 11/58 |
| JP | WO2002087003 A1 | * 8/2004 | H01M 50/429 |
| JP | WO2002093678 A1 | * 9/2004 | H01G 11/64 |
| JP | WO2002093679 A1 | * 9/2004 | H01G 11/60 |
| WO | WO2002087003 A1 | * 8/2004 | |
| WO | WO2002093678 A1 | * 9/2004 | |

(Continued)

OTHER PUBLICATIONS

Translation of JP ’628 (Year: 2018).*

(Continued)

*Primary Examiner* — Dion R. Ferguson
(74) *Attorney, Agent, or Firm* — Jenkins, Taylor & Hunt, P.A.

(57) ABSTRACT

A hydrogel composition and its use as an electrolyte in energy storage devices is described. The hydrogel can include a polyvinyl alcohol (PVA) matrix and an aqueous solution of lithium bromide (LiBr). The hydrogel electrolyte has high water retention ability, anti-freezing properties, is non-flammable, and has redox activity with a stable self-discharge rate.

16 Claims, 11 Drawing Sheets
(10 of 11 Drawing Sheet(s) Filed in Color)

discharge
power source or load
-
+
cathode
anode
Gel electrolyte

(56) References Cited

FOREIGN PATENT DOCUMENTS

WO WO2002093679 A1 * 9/2004

OTHER PUBLICATIONS

Translation of JP '074 (Year: 2019).*
Abbas, Q., Ratajczak, P. & Beguin, F. Sodium molybdate—an additive of choice for enhancing the performance of AC/AC electrochemical capacitors in a salt aqueous electrolyte. Faraday Discuss. 172, 199-214 (2014).
Ali, A. et al. 3D NiO nanowires@NiO nanosheets core-shell structures grown on nickel foam for high-performance supercapacitor electrode. J. Electroanal. Chem. 857, 113710 (2020).
Ali, B. A., Omar, A. M. A., Khalil, A. S. G. & Allam, N. K. Untapped Potential of Polymorph MoS2 : Tuned Cationic Intercalation for High-Performance Symmetric Supercapacitors. ACS Appl. Mater. Interfaces 11, 33955-33965 (2019).
Barba, M. I., Karachi, M. S. & Coronas, A. Quantitative analysis of the hydration of lithium salts in water using multivariate curve resolution of near-infrared spectra. Anal. Chim. Acta 919, 20-27 (2016).
Chen, L., Bai, H., Huang, Z. & Li, L. Mechanism investigation and suppression of self-discharge in active electrolyte enhanced supercapacitors. Energy Environ. Sci. 7, 1750-1759 (2014).
Chen, F. et al. Rational fabrication of anti-freezing, non-drying tough organohydrogels by one-pot solvent displacement. Angew. Chemie 130, 6678-6681 (2018).
Chodankar et al., "lonically conducting PVA-LiClO4 gel electrolyte for high performance flexible solid state supercapacitors," Jour. Colloid and Interface Science 460, 370-376 (2015).
El Sharkawy, H. M. et al. N-doped carbon quantum dots boost the electrochemical supercapacitive performance and cyclic stability of MoS2. J. Energy Storage 27, 101078 (2020).
Fic, K., Morimoto, S., Frackowiak, E. & Ishikawa, M. Redox Activity of Bromides in Carbon-Based Electrochemical Capacitors. Batter. Supercaps 3, 1080-1090 (2020).
Fic, K., Frackowiak, E. & Béguin, F. Unusual energy enhancement in carbon-based electrochemical capacitors. J. Mater. Chem. 22, 24213-24223 (2012).
Frackowiak, E., Fic, K., Meller, M. & Lota, G. Electrochemistry serving people and nature: High-energy ecocapacitors based on redox-active electrolytes. ChemSusChem 5, 1181-1185 (2012).
Ge, W., Cao, S., Yang, Y., Rojas, O. J. & Wang, X. Nanocellulose/LiCl systems enable conductive and stretchable electrolyte hydrogels with tolerance to dehydration and extreme cold conditions. Chem. Eng. J. 408, 127306 (2021). .
Ghanem, L. G., Shaheen, B. S. & Allam, N. K. 'Salt-in-Fiber' Electrolyte Enables High-Voltage Solid-State Supercapacitors. ACS Appl. Energy Mater. 5, 6410-6416 (2022).
Gong, W. et al. Improved supercapacitors by implanting ultra-long single-walled carbon nanotubes into manganese oxide domains. J. Power Sources 479, 228795 (2020).
Hashemi, M. et al. The use of an electrocatalytic redox electrolyte for pushing the energy density boundary of a flexible polyaniline electrode to a new limit. Nano Energy 44, 489-498 (2018).
Huang, H. et al. A Powder Self-Healable Hydrogel Electrolyte for Flexible Hybrid Supercapacitors with High Energy Density and Sustainability. Small 17, 2006807 (2021).
Jipa, I. M. et al. Potassium sorbate release from poly (vinyl alcohol)-bacterial cellulose films. Chem. Pap. 66, 138-143 (2012).
Li, M., Tang, Z., Leng, M. & Xue, J. Flexible solid-state supercapacitor based on graphene-based hybrid films. Adv. Funct. Mater. 24, 7495-7502 (2014).
Li, Q. et al. Redox enhanced energy storage in an aqueous high-voltage electrochemical capacitor with a potassium bromide electrolyte. J. Power Sources 348, 219-228 (2017).
Li, W., Gao, F., Wang, X., Zhang, N. & Ma, M. Strong and Robust Polyaniline-Based Supramolecular Hydrogels for Flexible Supercapacitors. Angew. Chemie 128, 9342-9347 (2016).
Ma, J. & Persson, I. A Study of the Hydration of the Alkali Metal Ions in Aqueous Solution. Inorg. Chem. 51, 425-438 (2012).
Mallakpaur et al., "Surface functionalization of GO, preparation and characterization of PVA/TRIS-GO nanocomposites," Polymer 81, 140-150 (2015).
Miller, J. R. & Burke, A. Electrochemical capacitors: challenges and opportunities for real-world applications. Electrochem. Soc. interface 17, 53 (2008).
Miller, J. R. & Simon, P. Electrochemical capacitors for energy management. Science 321, 651-652 (2008).
Pal, B., Yang, S., Ramesh, S., Thangadurai, V. & Jose, R. Electrolyte selection for supercapacitive devices: A critical review. Nanoscale Adv. 1, 3807-3835 (2019).
Qian, X. et al. Methods to study the ionic conductivity of polymeric electrolytes using a.c. impedance spectroscopy. J. Solid State Electrochem. 6, 8-15 (2001).
Qin, W. et al. "Mini-Review on the Redox Additives in Aqueous Electrolyte for High Performance Supercapacitors," ACS Omega 5, 3801-3808 (2020).
Senthilkumar, S. T., Selvan, R. K. & Melo, J. S. Redox additive/active electrolytes: a novel approach to enhance the performance of supercapacitors. J. Mater. Chem. A 1, 12386-12394 (2013).
Shao, Y. et al. Graphene-based materials for flexible supercapacitors. Chem. Soc. Rev. 44, 3639-3665 (2015).
Shen, C. et al. Applied Surface Science Rational design of activated carbon nitride materials for symmetric supercapacitor applications. Appl. Surf. Sci. 455, 841-848 (2018).
Simon, P., Gogotsi, Y. & Dunn, B. Where do batteries end and supercapacitors begin? Science 343, 1210-1211 (2014).
Su, L., Gong, L., Lu, H. & Xü, Q. Enhanced low-temperature capacitance of MnO2 nanorods in a redox-active electrolyte. J. Power Sources 248, 212-217 (2014).
Su, L., Gong, L., Lu, H. & Zhao Y. A new strategy to enhance low-temperature.
Sui, X. et al. lonic conductive hydrogels with long-lasting antifreezing, water retention, and self-regeneration abilities. Chem. Eng. J. 419, 129478 (2021).
Sun, K., Dong, M., Feng, E., Peng, H., Ma, G., Zhao, G. and Lei, Z. Q., "High performance solid state supercapacitor based on 2-mercapto pyridine redox-mediated gel polymer," RSC Advances 5, 22419-22425 DOI: 10.1039/C4RA15484C (2015).
Tran, V. C., Sahoo, S., Hwang, J., Nguyen, V. Q. & Shim, J. J., "Poly(aniline-co-pyrrole)-spaced graphene aerogel for advanced supercapacitor electrodes," J. Electroanal. Chem. 810, 154-160 (2018).
Wang, G. et al. Solid-state supercapacitor based on activated carbon cloths exhibits excellent rate capability. Adv. Mater. 26, 2676-2682 (2014).
Wang K. et al., "Chemically Crosslinked Hydrogel Film Leads to Integrated Flexible Supercapacitors with Superior Performance," Adv. Mater. 27(45), 7451-7457 (2015).
Wang, P. et al. Superhydrophobic Flexible Supercapacitors Formed by Integrating Hydrogel with Functional Carbon Nanomaterials. Chinese J. Chem. 39, 1153-1158 (2021).
Wang, Q. et al. Three-dimensional flower-like and hierarchical porous carbon materials as high-rate performance electrodes for supercapacitors. Carbon 67, 119-127 (2014).
Wang, Z. et al. All-climate aqueous fiber-shaped supercapacitors with record areal energy density and high safety. Nano Energy 50, 106-117 (2018).
Wang, Z., Orejon, D., Sefiane, K. & Takata, Y. Water vapor uptake into hygroscopic lithium bromide desiccant droplets: Mechanisms of droplet growth and spreading. Phys. Chem. Chem. Phys. 21, 1046-1058 (2019).
Wi, S. M. et al. A redox-mediator-integrated flexible micro-supercapacitor with improved energy storage capability and suppressed self-discharge rate. Nanomaterials 11, 3027, (2021).
Ye, W., Wang, H., Ning, J., Zhong, Y. & Hu, Y. New types of hybrid electrolytes for supercapacitors. J. Energy Chem. 57, 219-232 (2021).
Yu et al., "Improvement of the performance for quasi-solid-state supercapacitor by using PVA-KOH-KI polymer gel electrolyte," Electrochimica Acta 56(20), 6881-6886 (2011).

(56) References Cited

OTHER PUBLICATIONS

Yuk, H., Zhang, T., Parada, G. A., Liu, X. & Zhao, X. Skin-inspired hydrogel-elastomer hybrids with robust interfaces and functional microstructures. Nat. Commun. 7, 1-11 (2016).
Zhang, L. et al. A Review of Redox Electrolytes for Supercapacitors. Front. Chem. 8, 1-7 (2020).
Zhao, J. et al. A self-healing hydrogel electrolyte for flexible solid-state supercapacitors. Chem. Eng. J. 401, 125456 (2020).
Zhong, C. et al. A review of electrolyte materials and compositions for electrochemical supercapacitors. Chem. Soc. Rev. 44, 7484-7539 (2015).
Zhou, D. et al. Biomimetic Extreme-Temperature-and Environment-Adaptable Hydrogels. ChemPhysChem 20, 2139-2154 (2019).

* cited by examiner

SELF-REGENERATIVE ELECTROLYTES WITH INTRINSIC REDOX ACTIVITY FOR ENERGY STORAGE DEVICES

PRIORITY CLAIM

This application claims the priority benefit of U.S. Provisional Patent Application Ser. No. 63/449,007, filed Feb. 28, 2023, the disclosure of which is incorporated herein by reference in its entirety.

TECHNICAL FIELD

The presently disclosed subject matter relates to compositions comprising lithium bromide (LiBr) and polyvinyl alcohol (PVA), e.g., for use as highly conductive, self-regenerative hydrogel electrolytes. The composition can be used as an electrolyte in energy conversion/storage devices, electronic devices, and optoelectronic devices. The compositions are highly conductive, have high water retention and anti-freezing properties, are redox active with a stable self-discharge rate, and are non-flammable.

BACKGROUND

An electrolyte is a key component of any energy storage device. For example, an electrolyte plays an important role in the charge storage process by providing for charge transfer and balancing between two electrodes. Additionally, the electrolyte can determine the operating working potential window of the device at which it is stable and not deteriorating. Electrolytes can be in a liquid, solid, or quasi-solid state. Liquid electrolytes can be either organic or aqueous. The non-flammability, low toxicity and environmental impact, ease of maintenance, cost-effectiveness, and high specific heat capacity of aqueous electrolytes make them attractive. However, energy storage devices containing aqueous electrolytes are limited in their operational voltage to the breakdown voltage of water. On the other hand, while devices with organic electrolytes can operate at high potential near 3V, organic electrolytes typically have disadvantages, such as moderate to low energy density, high cost, and safety issues related to flammability. Furthermore, the use of liquid electrolytes can lead to a need for precise sealing/packaging, which can add volume and weight to the device. In fact, despite their strong ionic conductivity, liquid electrolytes are generally unsuited for ultrathin, lightweight, and flexible energy storage devices needed for portable and wearable electronic devices.

Hydrogel electrolytes can provide an attractive alternative to liquid electrolytes for a plethora of functional devices due to their flexibility and high electronic and ionic conductivity. However, currently used hydrogel electrolytes tend to lose their water content during use in devices, especially under operation. For example, current hydrogel electrolytes used in batteries, supercapacitors, electronic devices, and the like often become dry and crack upon cycling as they lose most of their water content. This can result in device malfunction. In addition, currently used electrolytes can malfunction at the freezing temperatures, while many, especially those use in energy storage devices, are also typically flammable and instable.

Accordingly, there is an ongoing need for new hydrogel compositions suitable for use as electrolytes, particularly those with an ability to self-regenerate and/or retain water, that do not freeze at low temperatures, that are non-flammable, and that are redox active and stable.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In some embodiments, the presently disclosed subject matter provides hydrogel comprising a polymeric matrix and a solution comprising water and a salt, wherein the polymeric matrix comprises polyvinyl alcohol (PVA) and wherein the salt comprises lithium bromide (LiBr). In some embodiments, the hydrogel comprises (i) about 2 parts of an aqueous solution of LiBr having a LiBr concentration of about 0.5 M to about 5 M and (ii) about one part of an aqueous solution comprising about 0.15 grams per milliliter (g/mL) PVA.

In some embodiments, the hydrogel remains unfrozen at a temperature below 0 degrees Celsius (° C.), optionally wherein the hydrogel remains unfrozen to a temperature as low as about −30° C. In some embodiments, the hydrogel retains at least about 70% or more of an initial water content over a time period of about 24 hours. In some embodiments, the hydrogel has an ionic conductivity of about 95 milliSiemens per centimeter ($mS \cdot cm^{-1}$).

In some embodiments, the presently disclosed subject matter provides a method of preparing a hydrogel electrolyte, wherein the method comprises: (i) preparing a first solution, wherein the first solution comprises an aqueous solution of PVA; (ii) preparing a second solution, wherein the second solution comprises an aqueous solution of LiBr; and (iii) adding a volume of the first solution to a volume of the second solution to provide a mixture and stirring the mixture for a period of time to provide a clear composition, thereby providing the hydrogel electrolyte. In some embodiments, the second solution has a concentration of LiBr of about 0.5 M to about 5 M. In some embodiments, the first solution comprises about 0.15 g of PVA per mL.

In some embodiments, preparing the first solution comprises adding PVA to deionized water to provide a PVA mixture and stirring the PVA mixture at an elevated temperature, optionally at a temperature of about 80 degrees Celsius (° C.), for a period of time until the PVA mixture becomes clear. In some embodiments, a ratio of the volume of the second solution to the volume of the first solution is about 2:1.

In some embodiments, the presently disclosed subject matter provides a hydrogel electrolyte prepared by the method comprising: (i) preparing a first solution, wherein the first solution comprises an aqueous solution of PVA; (ii) preparing a second solution, wherein the second solution comprises an aqueous solution of LiBr; and (iii) adding a volume of the first solution to a volume of the second solution to provide a mixture and stirring the mixture for a period of time to provide a clear composition, wherein said hydrogel electrolyte is non-flammable, redox active, remains unfrozen at a temperature of about −30° C., and/or is capable of regenerating, after dehydration, at least about 70% of an initial water content over a time period of about 24 hours. In some embodiments, the presently disclosed subject matter provides a device comprising the hydrogel electrolyte. In some embodiments, the device is selected from a battery, a capacitor, a supercapacitor, and an opto-electronic device.

In some embodiments, the presently disclosed subject matter provides an energy storage device comprising: (a) a cathode; (b) an anode; and (c) the hydrogel electrolyte prepared by the method comprising: (i) preparing a first solution, wherein the first solution comprises an aqueous solution of PVA; (ii) preparing a second solution, wherein the second solution comprises an aqueous solution of LiBr; and (iii) adding a volume of the first solution to a volume of the second solution to provide a mixture and stirring the mixture for a period of time to provide a clear composition; wherein the hydrogel electrolyte is disposed between the anode and the cathode.

In some embodiments, the cathode and/or the anode comprise activated carbon and/or graphite. In some embodiments, the energy storage device has an operating potential window of about 1.8 volts (V). In some embodiments, the energy storage device has a specific capacitance of up to about 63.3 farads per gram (F/g). In some embodiments, the energy storage device has an energy density of about 20.5 watt-hours per kilogram (Wh/kg) and/or a power density of about 3430 watts per kilogram (W/kg). In some embodiments, during a self-discharge test, the energy storage device takes more than 10,800 seconds to drop from about 1.8 V to about 0.3 V.

Accordingly, it is an object of the presently disclosed subject matter to provide a hydrogel, a method of preparing a hydrogel electrolyte, and to related energy storage devices.

An object of the presently disclosed subject matter having been stated hereinabove, and which is achieved in whole or in part by the compositions and methods disclosed herein, other objects will become evident as the description proceeds when taken in connection with the accompanying Figures as best described herein below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary implementations of the subject matter described herein will now be explained with reference to the accompanying drawings, of which.

DETAILED DESCRIPTION

Figure 1:
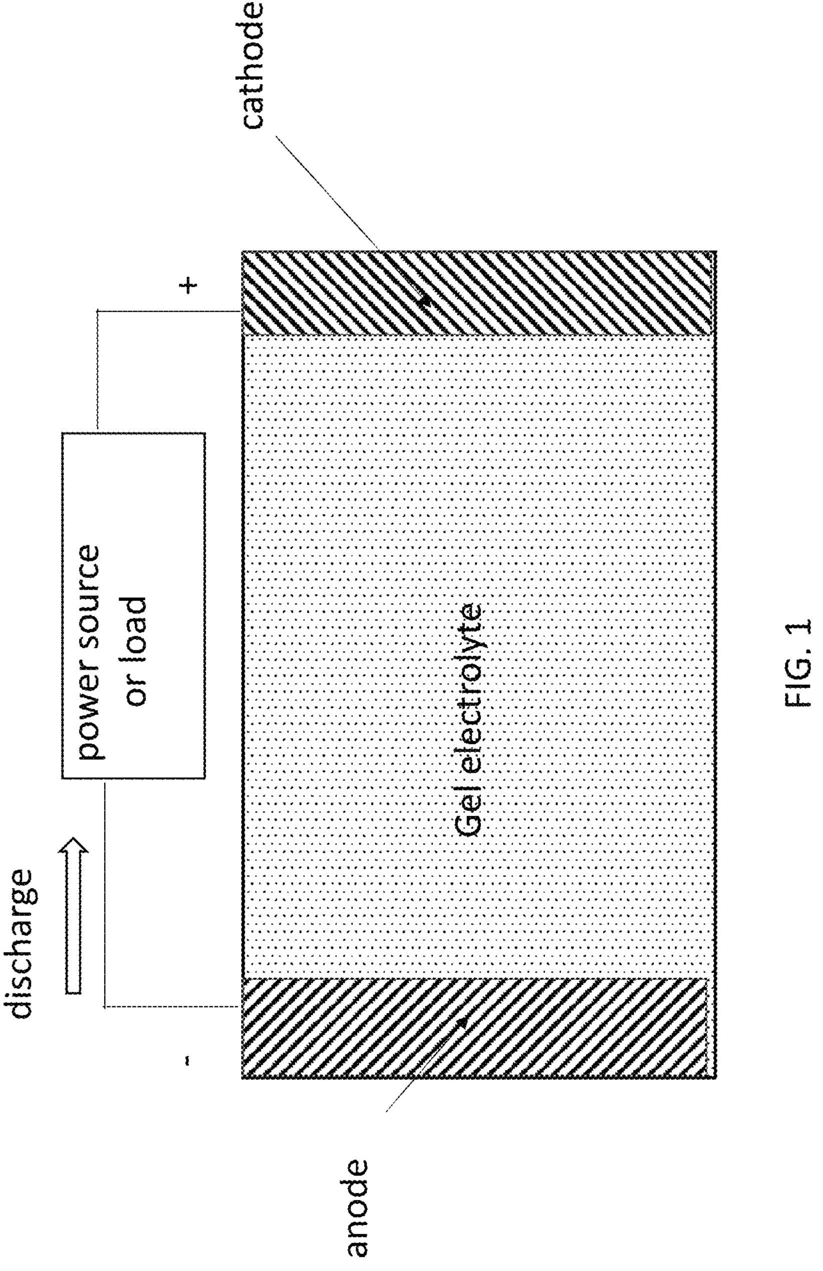
FIG. 1 is a schematic diagram illustrating an exemplary energy storage device using a hydrogel electrolyte disposed between two electrodes, i.e., an anode and a cathode.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

Unless otherwise indicated, all numbers expressing quantities of time, temperature, concentration, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

The term "hydrogel" as used herein refers to a porous, permeable material (e.g., solid material) comprising a three-dimensional network (e.g., a three-dimensional cross-linked network) of hydrophilic polymeric chains (i.e., "a polymeric matrix") that can swell but not dissolve in an aqueous medium or to the hydrated material formed by contacting the network of hydrophilic polymeric chains with an aqueous medium. For example, following contact with an aqueous medium, the hydrogel can comprise hydrated hydrophilic polymeric chains and "hold" water, e.g., to form a liquid or semi-solid material. In some embodiments, the hydrogel can swell to comprise at least 10% (e.g., about 10% to about 20%) by weight or volume of water or an aqueous fluid.

When the hydrogel is dehydrated/unswollen, it can also be referred to as a "dehydrated hydrogel."

II. Hydrogels and Related Methods and Devices

The presently disclosed subject matter addresses many issues of prior electrolytes by providing a self-regenerative, anti-freezing, non-flammable, redox active, and stable hydrogel electrolyte. More particularly, according to one aspect of the presently disclosed subject matter, a composition comprising a hydrogel is provided. The hydrogel comprises or consists of (i) a PVA matrix (i.e., a three-dimensional network of PVA chains) and (2) an aqueous solution comprising LiBr (e.g., water and LiBr). The hydrogel can be used as a hydrogel electrolyte in a variety of devices, e.g., batteries, capacitors, supercapacitors, and optoelectronic devices.

The presently disclosed subject matter further provides a method of preparing a hydrogel electrolyte comprising PVA and LiBr, as well as a device, e.g., an energy storage device, comprising the hydrogel electrolyte. The device can further comprise one or more electrodes (e.g., a cathode and an anode).

Figure 3A:
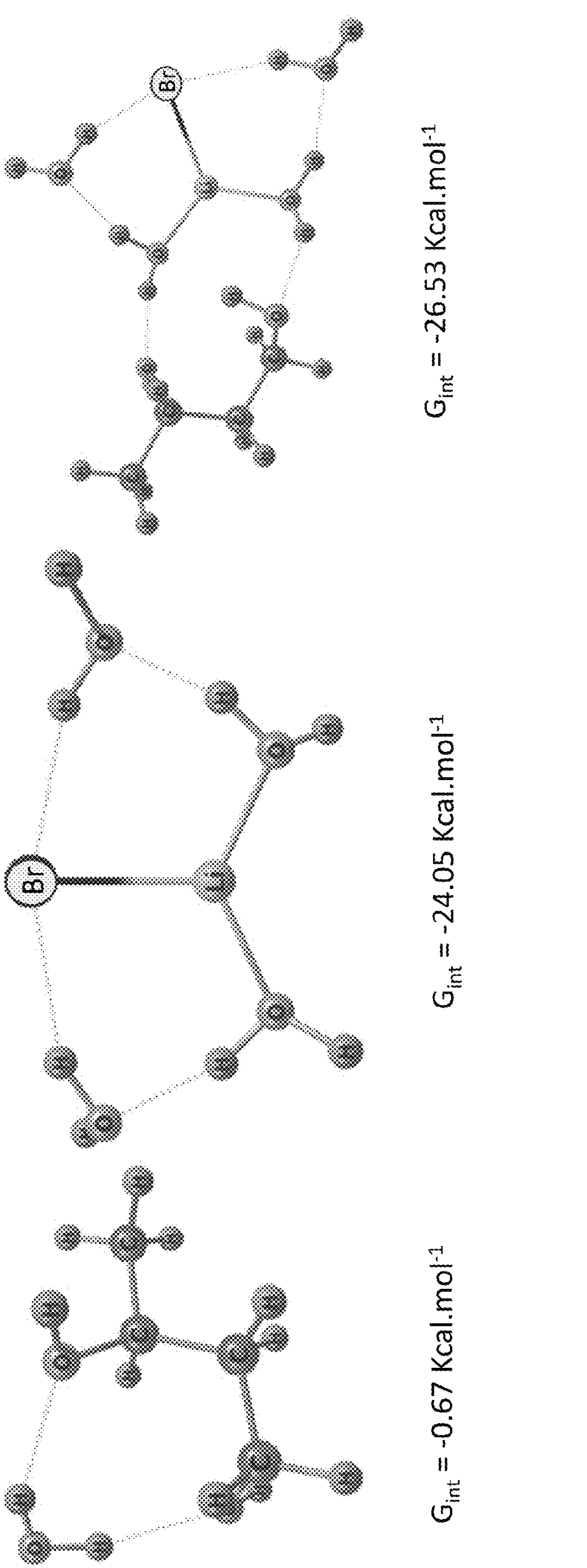
FIG. 3A is a schematic illustration of (from left to right) the geometries of (left) a sub-section of a polyvinyl alcohol chain hydrogen bonding with a water molecule (PVA-$H_2O$), (center) lithium bromide bonding with four water molecules (LiBr-$4H_2O$), and (right) a polyvinyl alcohol subsection bonding with LiBr-$4H_2O$ used for density functional theory (DFT) calculations.

The presently disclosed subject matter provides a facile synthesis approach of novel hydrogel electrolytes based on a PVA matrix and comprising LiBr (i.e., LiBr@PVA) and their utilization in energy storage devices. The presently disclosed electrolyte can regenerate more than 70% of its water content via absorption of water from the surrounding environment within 24 hours. DFT calculations were used to unravel the reason behind the high-water retention ability of the fabricated hydrogel. See FIG. 3A. More particularly, without being bound to any one theory, the mechanism of the regeneration after heating is believed to involve four steps: hydrogel dehydration, water vapor diffusion into the surrounding air, phase change transition of vapor to water at the air/hydrogel interface, and the water diffusion into the hydrogel.

Figure 2B:
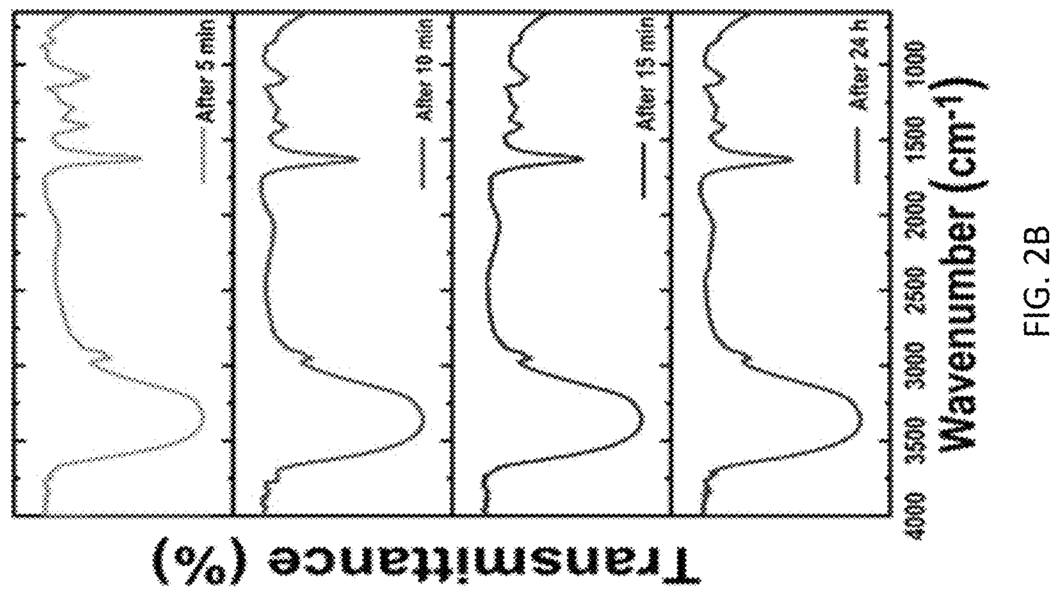
FIG. 2B is a series of Fourier-transform infrared (FT-IR) spectra (transmittance (in percentage (%)) versus wavenumber (in inverse centimeters ($cm^{-1}$))) of a polyvinyl alcohol (PVA) hydrogel comprising lithium bromide (LiBr) after five minutes (top), after 10 minutes (second from top), after 15 minutes (second from bottom), and after 24 hours (bottom).
Figure 2A:
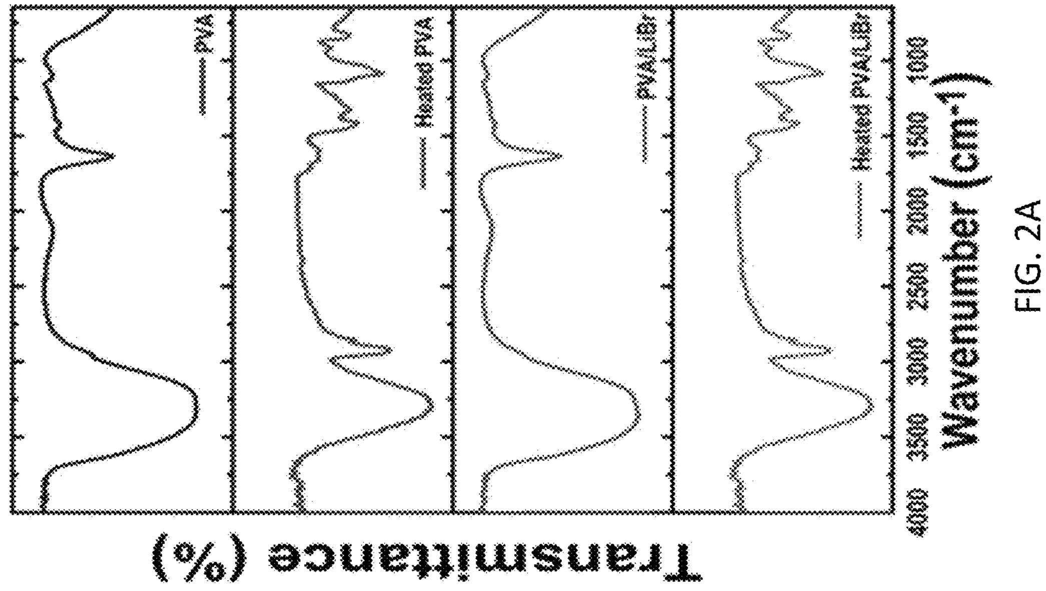
FIG. 2A is a series of Fourier-transform infrared (FT-IR) spectra (transmittance (in percentage (%)) versus wavenumber (in inverse centimeters ($cm^{-1}$))) of a polyvinyl alcohol (PVA) hydrogel before dehydration (top), a PVA hydrogel after dehydration (second from top), a PVA hydrogel comprising lithium bromide (LiBr) before dehydration (second from bottom), and the PVA hydrogel comprising LiBr after dehydration (bottom).
Figure 3C:
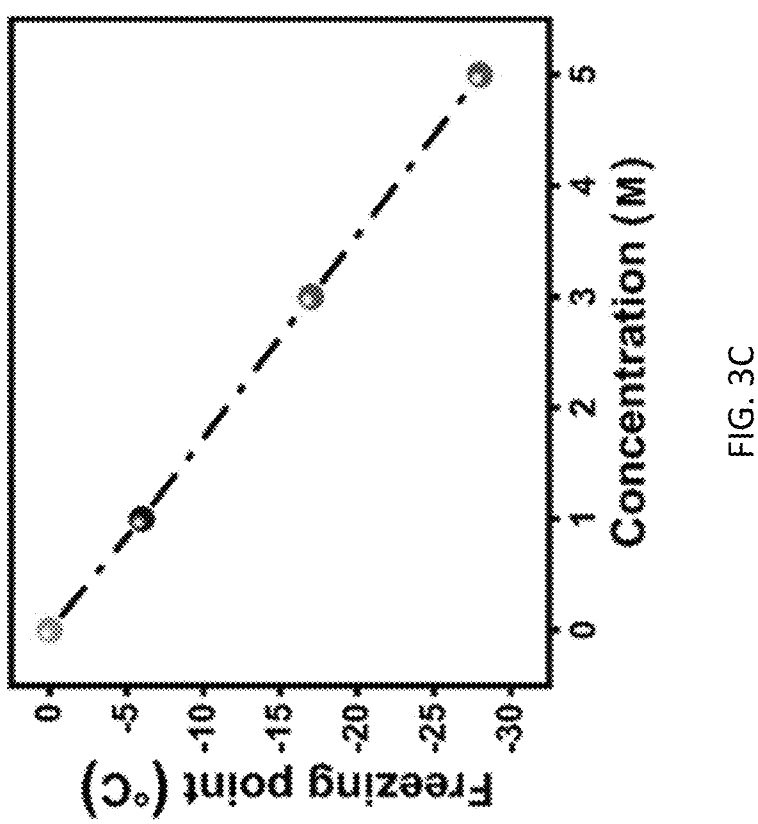
FIG. 3C is a graph showing the freezing points (in degrees Celsius (C)) of a polyvinyl alcohol hydrogel (PVA, control), and a PVA hydrogel including a lithium bromide (LiBr) solution (1, 3, or 5 Molar (M) LiBr).
Figure 3B:
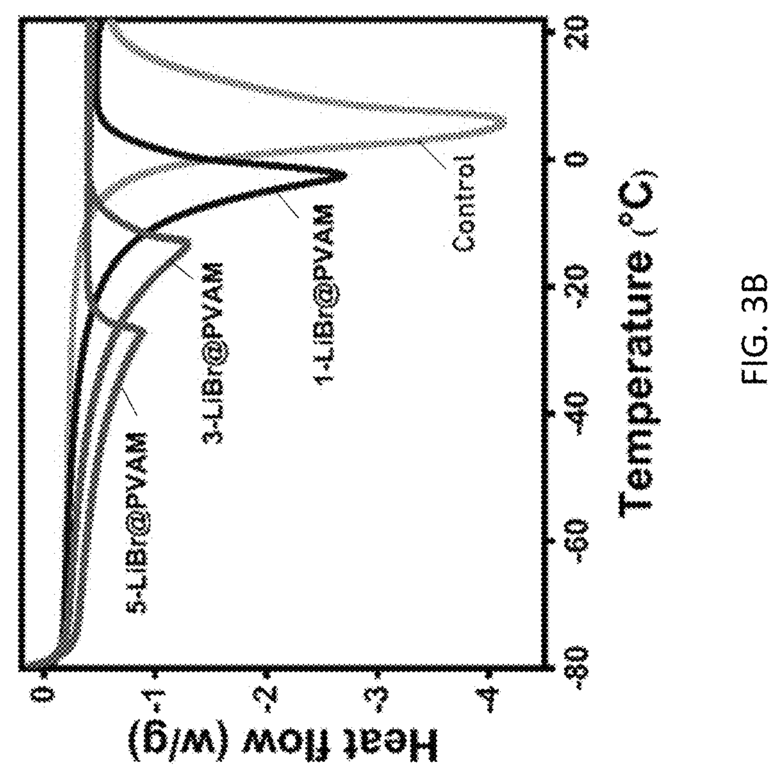
FIG. 3B is a graph showing the differential scanning calorimetry (DSC) curves (heat flow (in watts per gram (w/g)) versus temperature (in degrees Celsius (° C.))) of a polyvinyl alcohol hydrogel (PVA, control), a PVA hydrogel comprising a 1 Molar (M) lithium bromide solution (1-LiBr@PVAM), a PVA hydrogel comprising a 3 M LiBr solution (3-LiBr@PVAM), and a PVA hydrogel comprising a 5 M LiBr solution (5-LiBr@PVAM).

In addition, DSC analysis (see FIG. 3B) revealed the anti-freezing properties of the hydrogel electrolyte, which can remain unfrozen below the freezing point of water, e.g., at below about −5° C., at below about −15° C., or at −30° C. See FIG. 3C. Also, the FT-IR and SEM analyses confirmed the structure of the electrolyte and further helped to identify the mechanism of regeneration. See FIGS. 2A and 2B.

The presently disclosed hydrogel electrolyte showed higher ionic conductivity than those previously reported in the literature. See Table 1, below. In some embodiments, the hydrogel electrolyte had an ionic conductivity of about 85 $mS \cdot cm^{-1}$ or more. In some embodiments, the hydrogel electrolyte had an ionic conductivity of about 95 $mS \cdot cm^{-1}$.

TABLE 1

Hydrogel Electrolyte Ionic Conductivities.

| Electrolyte Composite | Ionic Conductivity ($mS \cdot cm^{-1}$) | Reference |
|---|---|---|
| PVA + LiBr + $H_2O$ | 95 | This work |
| PVA/$LiClO_4$/$H_2O$ | 48 | 47 |
| PEO/PMMA/Lithium iodide/iodine/4-tert-butyl-pyridine | 7 | 48 |
| PVA/$H_3PO_4$/$H_2O$ | 11.58 | 49 |
| PVA/$H_2SO_4$/Glutaraldehyde/$H_2O$ | 82 | 50 |
| PVA/$H_2SO_4$/$H_2O$ | 7.1 | 51 |
| PVA/$H_2SO_4$/IC/$H_2O$ | 20.27 | 51 |

Figures 5A, 5B:
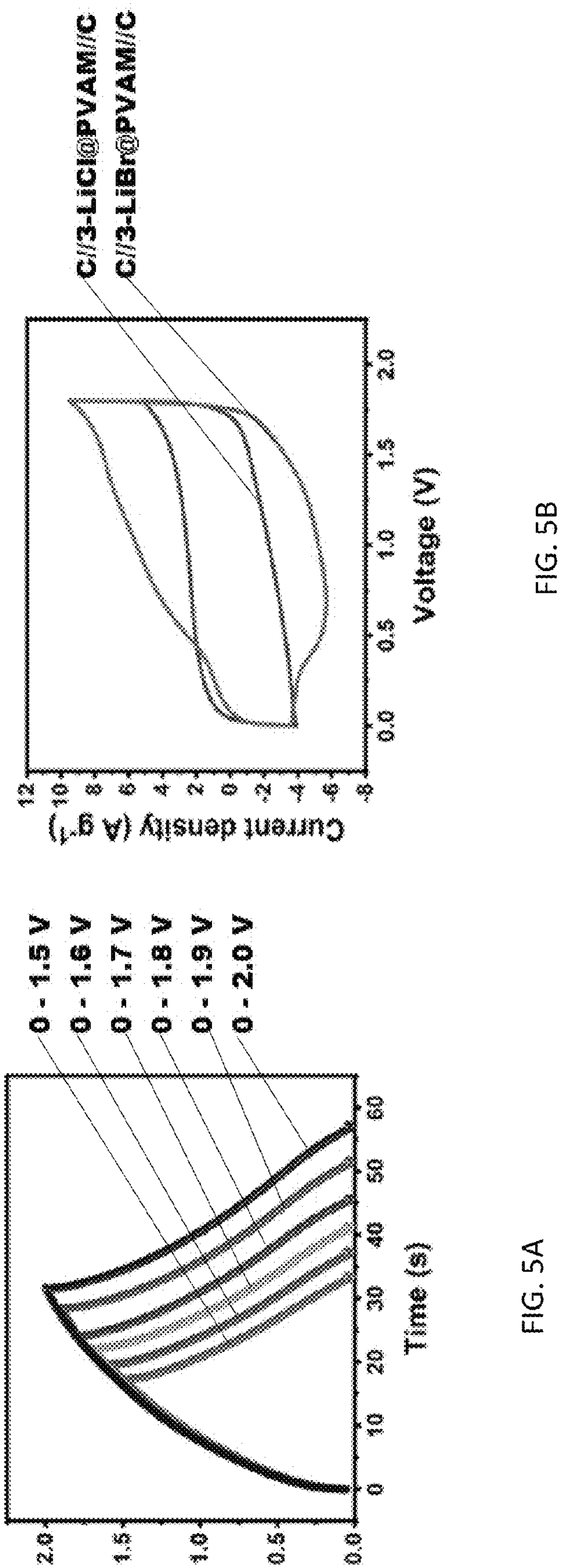
FIG. 5A is a graph showing the galvanostatic charge-discharge curves (GCDs, voltage (in volts (V)) versus time (in seconds (S))) in different potential windows of an assembled device including two carbon electrodes separated by an electrolyte comprising a polyvinyl alcohol (PVA) hydrogel prepared with a 3 molar (M) lithium bromide solution (C//3-LiBr@PVAM//C).
FIG. 5B is a graph showing the cyclic voltammograms (CVs, current density (in ampere per g (A $g^{-1}$) versus voltage (in volts (V))) of assembled devices including two carbon electrodes separated by an electrolyte comprising a polyvinyl alcohol (PVA) hydrogel prepared with either a 3 molar (M) lithium chloride (LiCl) solution (C//3-LiCl@PVAM//C) or a 3 M lithium bromide (LiBr) solution (C//3-LiBr@PVAM//C).
Figures 5C, 5D:
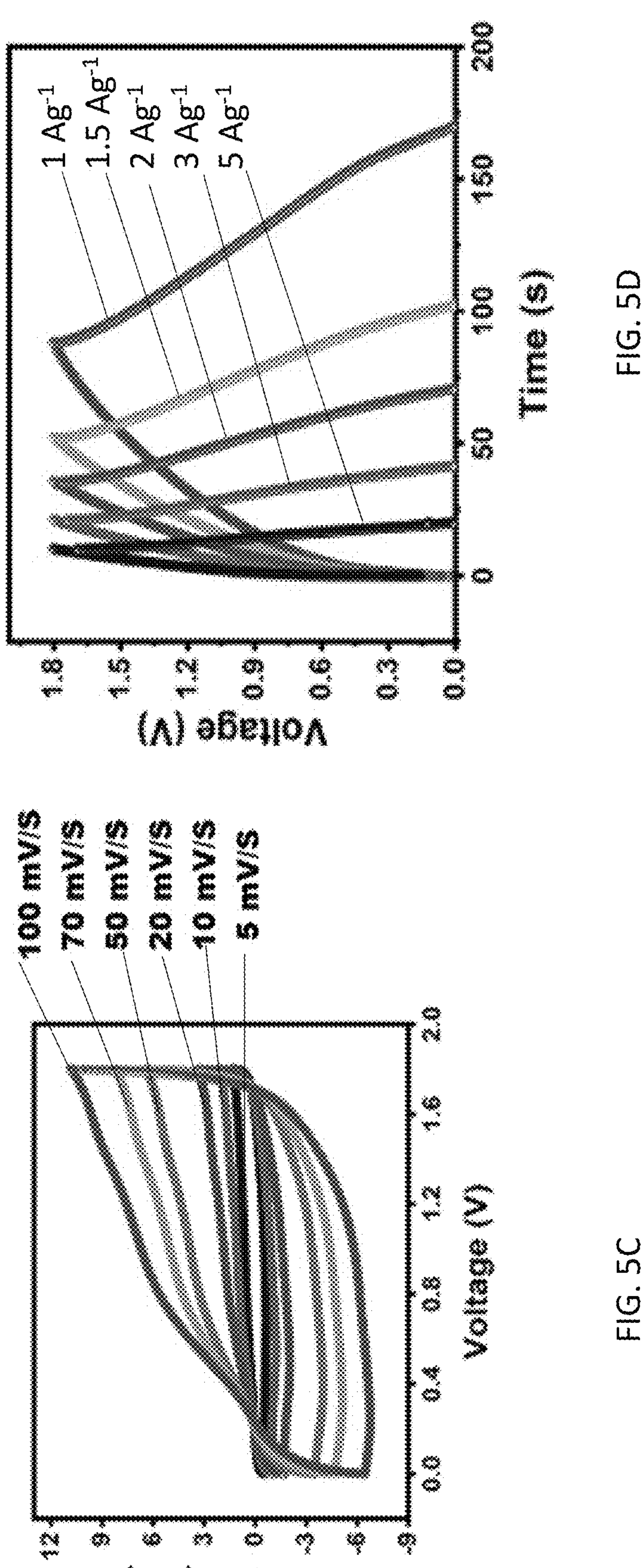
FIG. 5C is a graph showing the cyclic voltammograms (CVs, current density (in ampere per g (A $g^{-1}$) versus voltage (in volts (V))) of an assembled device including two carbon electrodes separated by an electrolyte comprising a polyvinyl alcohol (PVA) hydrogel prepared with a 3 M lithium bromide (LiBr) solution (C//3-LiBr@PVAM//C) at different scan rates (5, 10, 20, 50, 70, and 100 millivolts per second (mV/S).
FIG. 5D is a graph showing the galvanostatic charge-discharge curves (GCDs, voltage (in volts (V)) versus time (in seconds (S))) at different current densities (1 ampere per gram ($Ag^{-1}$), 1.5 $Ag^{-1}$, 2 $Ag^{-1}$, 3 $Ag^{-1}$, 5 $Ag^{-1}$), of an assembled device including two carbon electrodes separated by an electrolyte comprising a polyvinyl alcohol (PVA) hydrogel prepared with a 3 molar (M) lithium bromide solution (C//3-LiBr@PVAM//C).
Figure 5F:
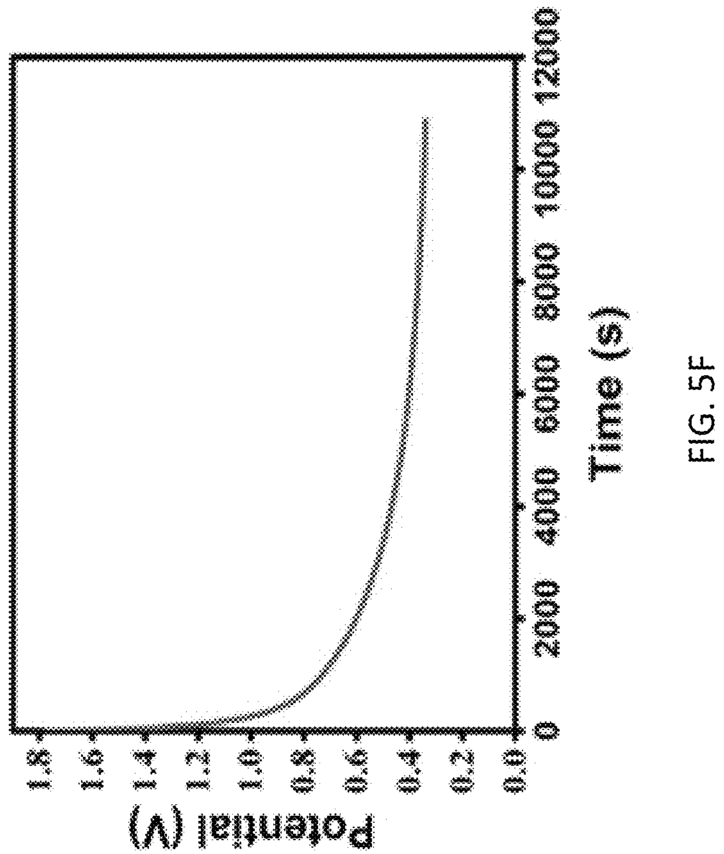
FIG. 5F is a graph showing the self-discharge profile (potential (in volts (V)) versus time (in seconds (s))) of an assembled device with two carbon electrodes separated by an electrolyte comprising a polyvinyl alcohol (PVA) hydrogel prepared with a 3 molar (M) lithium bromide solution (C//3-LiBr@PVAM//C).
Figure 5E:
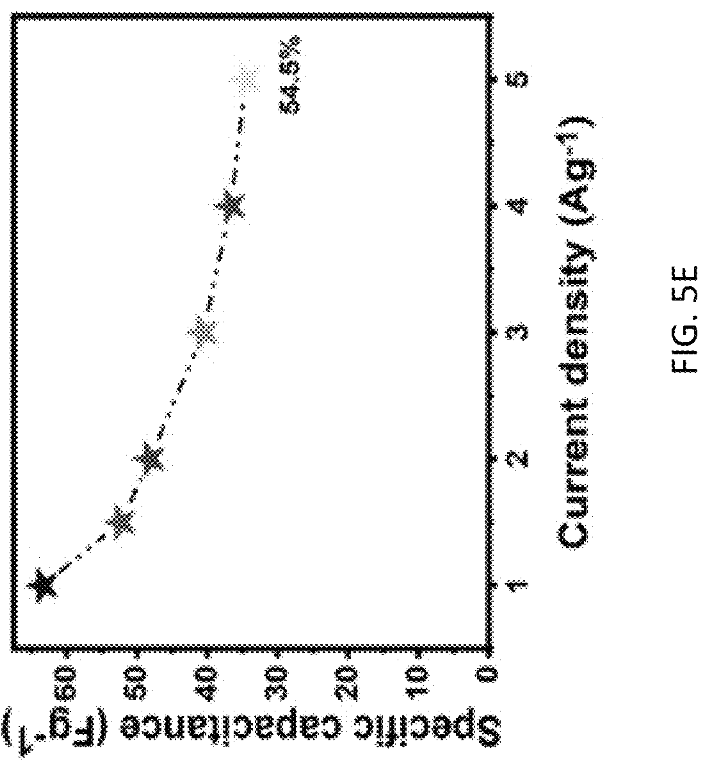
FIG. 5E is a graph showing the variation of specific capacitance with current density in an assembled device including two carbon electrodes separated by an electrolyte comprising a polyvinyl alcohol (PVA) hydrogel prepared with a 3 molar (M) lithium bromide solution (C//3-LiBr@PVAM//C).

Upon testing the hydrogel as an electrolyte in supercapacitor devices, the fabricated C//3-LiBr@PVAM//C device showed high operating potential window of 1.8 V and took more than 10,800 s to drop from 1.8 V to 0.3 V during the self-discharge testing. See FIG. 5F. In addition, the intrinsic redox properties of the electrolyte caused an increase in the specific capacitance, reaching 63.3 F/g. See FIG. 5E. The fabricated device exhibited high specific capacitance compared to similar systems reported in the literature. The device can deliver high energy density of ~20.5 Wh/kg with a power density of 3430 W/kg.

Thus, the presently disclosed subject matter provides a self-regenerative electrolyte with intrinsic redox activity as well as anti-freeze properties and inflammable characteristics. The presently disclosed electrolyte can provide for the fabrication of highly stable and durable devices for a plethora of applications. For instance, FIG. 1 illustrates an exemplary energy storage device where the electrolyte is disposed between two electrodes, i.e., a cathode and an anode. The electrodes (e.g., the cathode and/or the anode) and comprise activated carbon and/or graphite. In some embodiments, at least one electrode can comprise activated carbon configured on a graphite sheet.

Accordingly, in some embodiments, the presently disclosed subject matter provides a hydrogel (e.g., a hydrogel electrolyte material) comprising a polymeric matrix and a solution comprising water and a salt, wherein the polymeric matrix comprises PVA and wherein the salt comprises LiBr. In some embodiments, the hydrogel comprises (i) about 2 parts (by volume) of an aqueous solution comprising LiBr and (ii) about one part (by volume) of an aqueous solution comprising PVA. In some embodiments, the LiBr concentration of the aqueous LiBr solution is about 0.5 M to about 5 M (e.g., about 0.50 M, about 0.75 M, about 1.0 M, about 1.25 M, about 1.50 M, about 1.75 M, about 2.0 M, about 2.25 M, about 2.50 M, about 2.75 M, about 3.0 M, about 3.25 M, about 3.50 M, about 3.75 M, about 4.0 M, about 4.25 M, about 4.50 M, about 4.75 M, or about 5.0 M). In some embodiments, the aqueous solution of PVA comprises about 0.15 g/mL PVA.

In some embodiments, the hydrogel is anti-freezing (i.e., the hydrogel does not freeze when exposed to temperatures at or below the freezing point of water). For example, in some embodiments, the hydrogel remains unfrozen at a temperature below 0 degrees Celsius (C). In some embodiments, the hydrogel remains unfrozen to a temperature of about −5° C., about −10° C., about −15° C., about −20° C. or of about −25° C. or less. In some embodiments, the hydrogel remains unfrozen to a temperature as low as about −30° C.

In some embodiments, the presently disclosed hydrogel has high water retention. For instance, in some embodiments, the hydrogel retains at least about 70% or more of an initial water content over a time period of about 24 hours. In some embodiments, the hydrogel maintains at least about 75%, about 80%, about 85%, about 90% or about 95% or more of an initial water content for a time period of about 24 hours under ambient conditions (e.g., room temperature and 30% to 60% RH). In some embodiments, the hydrogel has an ionic conductivity of about 85 milliSiemens per centimeter ($mS\cdot cm^{-1}$) or more. In some embodiments, the hydrogel has an ionic conductivity of about 90 $mS\cdot cm^{-1}$ or more. In some embodiments, the hydrogel has an ionic conductivity of about 95 $mS\cdot cm^{-1}$.

In some embodiments, the presently disclosed subject matter provides a method of preparing a hydrogel electrolyte. In some embodiments, the method comprises: (i) preparing a first solution, wherein the first solution comprises an aqueous solution of PVA; (ii) preparing a second solution, wherein the second solution comprises an aqueous solution of LiBr; and (iii) adding a volume of the first solution to a volume of the second solution to provide a mixture and stirring the mixture for a period of time to provide a clear composition, thereby providing the hydrogel electrolyte.

In some embodiments, preparing the first solution comprises adding PVA to an aqueous solution (e.g., deionized water) and stirring the resulting PVA mixture until it is clear. In some embodiments, the stirring is performed at a temperature between about 20° C. and about 90° C. (e.g., about 20° C., about 25° C., about 30° C., about 35° C., about 40° C., about 45° C., about 50° C., about 55° C., about 60° C., about 65° C., about 70° C., about 75° C., about 80° C., about 85° C., or about 90° C. In some embodiments, the stirring is performed at an elevated temperature (i.e., a temperature about 25° C.). In some embodiments, the stirring is performed at a temperature of about 60° C. to about 85° C. In some embodiments, the stirring is performed at a temperature of about 80° C. In some embodiments, the stirring is performed for about 1 to about 5 hours (e.g., about 3 hours). In some embodiments, the first solution is prepared to have a PVA concentration of about 0.15 g per ml of solution.

In some embodiments, the second solution comprises adding LiBr to an aqueous solution (e.g., deionized water). In some embodiments, the second solution has a concentration of LiBr of about 0.5 M to about 5 M (e.g., about 0.50 M, about 0.75 M, about 1.0 M, about 1.25 M, about 1.50 M, about 1.75 M, about 2.0 M, about 2.25 M, about 2.50 M, about 2.75 M, about 3.0 M, about 3.25 M, about 3.50 M, about 3.75 M, about 4.0 M, about 4.25 M, about 4.50 M, about 4.75 M, or about 5.0 M).

In some embodiments, adding a volume of the first solution to a volume of the second solution to provide a mixture (i.e., a PVA/LiBr mixture) comprises adding about 2 parts of the second solution by volume to about 1 part by volume of the first solution (i.e., so that the ratio of the volume of the second solution to the volume of the first solution is about 2:1). In some embodiments, the hydrogel electrolyte prepared by the presently disclosed method is non-flammable, redox active, remains unfrozen at a temperature of about −30° C., and/or retains at least about 70% of an initial water content over a time period of about 24 hours.

In some embodiments, the presently disclosed subject matter provides a device comprising the PVA/LiBr hydrogel. In some embodiments, the hydrogel is a hydrogel electrolyte prepared according to the presently disclosed method. In some embodiments, the device is an energy storage device (e.g., a battery, a capacitor, or a supercapacitor). In some embodiments, the device is selected from the group comprising a battery, a capacitor, a supercapacitor, and an optoelectronic device.

In some embodiments, the presently disclosed subject matter provides an energy storage device comprising at least two electrodes and a hydrogel electrolyte of the presently disclosed subject matter disposed between at least two of the electrodes. In some embodiments, the energy storage device comprises: (a) a cathode; (b) an anode; and (c) the hydrogel electrolyte disposed between the anode and the cathode. The device can further include a container to hold the electrodes and the electrolyte. An exemplary energy storage device of the presently disclosed subject matter is shown in FIG. 1.

Each electrode (e.g., the cathode and/or anode) can be formed of any suitable material or combination of materials, e.g., a metal or a carbon-based material, such as activated carbon or graphite. In some embodiments, one or more electrode comprises activated carbon disposed on a graphite sheet.

In some embodiments, the energy storage device has an operating potential window of about 1.8 volts (V). In some embodiments, the energy storage device has a specific capacitance of up to about 63.3 F/g. In some embodiments, the energy storage device has an energy density of about 20.5 Wh/kg and/or a power density of about 3430 W/kg. In some embodiments, during a self-discharge test, the energy storage device takes more than 10,800 seconds to drop from about 1.8 V to about 0.3 V.

EXAMPLES

The following Examples provide illustrative embodiments. In light of the present disclosure and the general level of skill in the art, those of ordinary skill will appreciate that the following Examples are intended to be exemplary only and that numerous changes, modifications, and alterations can be employed without departing from the scope of the presently claimed subject matter.

Materials

Commercial activated carbon was purchased from Xinruida, Poly (Vinylidene Difluoride) (PVDF) binder, N,N-dimethylfromamide (DMF), and anhydrate Lithium Bromide (LiBr, 99%) were purchased from Alfa Aesar (Germany), poly(vinyl alcohol) (PVA) with a high molecular weight was purchased from Alfa Aesar (Germany), and graphite sheets (0.3 mm thick) were obtained from Xinruida.

Preparation of the Novel Hydrogel Electrolyte:

3 g of PVA were added to 20 mL Deionized Water. Then, the mixture was stirred at 80° C. for 3 hours until the solution became clear. LiBr solutions with different LiBr concentrations (0.5 M, 1 M, 2 M, 3 M, and 5 M) were prepared using deionized water. Then, LiBr/PVA solutions were prepared by adding a portion of an LiBr solution to a portion of the PVA solution (2:1 ratio). Note that the final solutions were kept under continuous stirring until they become clear. The samples were designated as 0.5-LiBr@PVAM, 1-LiBr@PVAM, 2-LiBr@PVAM, 3-LiBr@PVAM, and 5-LiBr@PVAM based on the LiBr concentration of the solution used to prepare the sample, i.e., 0.5, 1, 2, 3, and 5 M LiBr, respectively.

Regeneration Tests:

The hydrogel LiBr@PVA samples were burned in TGA device (Model A2100 from Labtorn) at 80° C. for 220 min until all water was evaporated. Then, the gel electrolyte was put at room temperature (25° C.) and 54% relative humidity (RH). The weight of samples was taken manually every hour for 1 day. Consequently, the absorption efficiency was calculated according to Eq. 1.

$$\text{Absorption Efficiency \%} = \left(\frac{w - w_s}{w_0 - w_s}\right) \times 100 \tag{1}$$

where w is the measured weight of the hydrogel, $w_s$ is the weight of the sample after dehydration, and the $w_0$ is the original weight (before dehydration).

Figure 4:
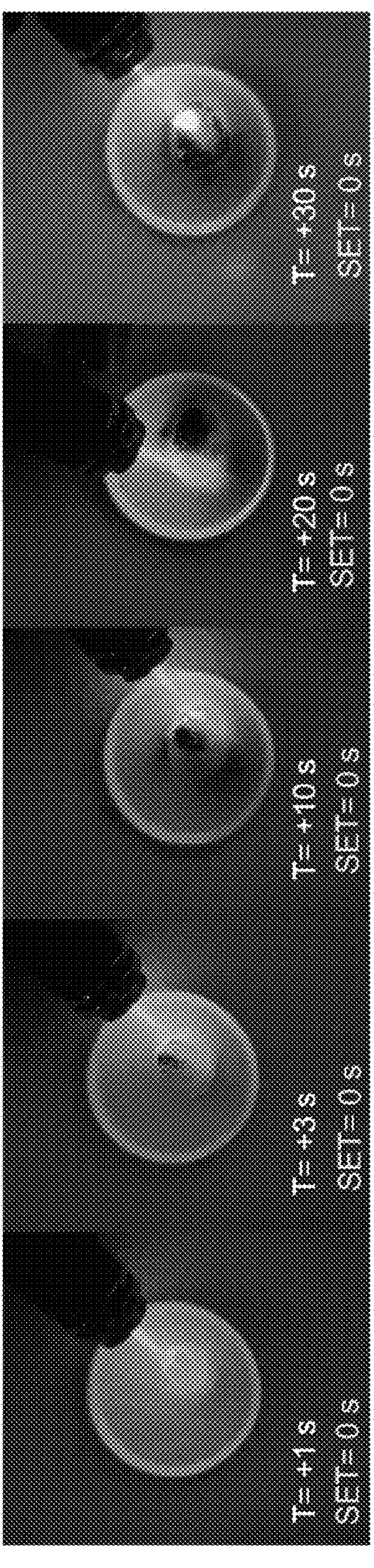
FIG. 4 is a series of photographic images showing the self-extinguishing time (SET) (in seconds (s)) of a polyvinyl alcohol hydrogel containing lithium bromide when exposed to a direct flame for (from left to right) 1, 3, 10, 20, or 30 seconds.

Flammability Tests:

A known amount of electrolyte was placed in a ceramic container and exposed to direct flame at a constant distance while observing the time to calculate the self-extinguishing time (SET). See FIG. 4. Due to a lack of flammable components, the SET of the electrolyte was 0 s/g.

Electrochemical Measurements:

The electrochemical performance of the fabricated devices using a 3-LiBr@PVAM hydrogel electrolyte and two electrodes with equivalent mass loaded from activated carbon on graphite sheet electrodes was investigated using a Biologic SP300 potentiostat. See FIGS. 5A-5F.

Figure 6B:
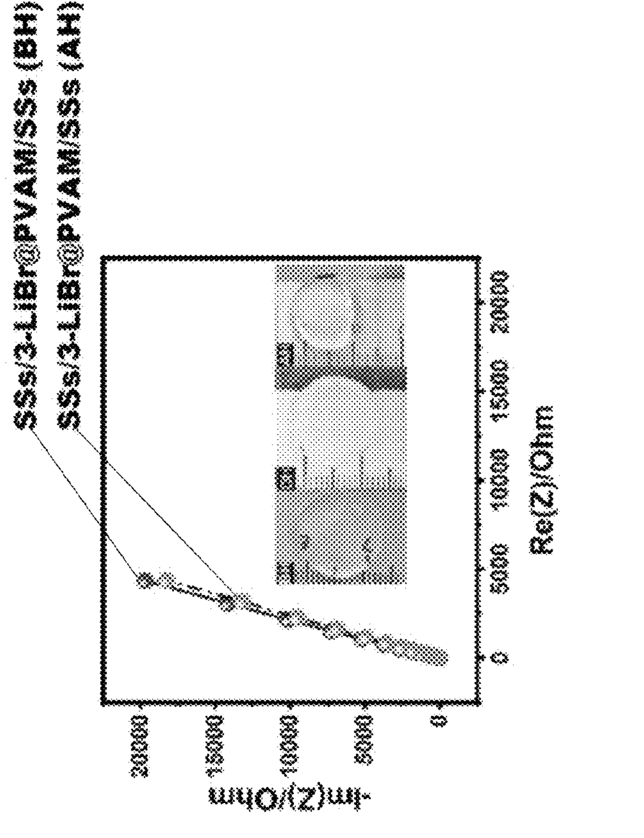
FIG. 6B is a graph showing the potential electrochemical impedance spectroscopy (PEIS) behavior of a two-electrode ion-blocking cell with two stainless steel strip (SSs) electrodes separated by an electrolyte comprising a polyvinyl alcohol (PVA) hydrogel prepared with a 3 molar (M) lithium bromide solution (SSs/3-LiBr@PVAM/SSs) before heating (BH) and after heating (AH). The inset shows photographic images of the electrolyte BH, AH, and during heating (DH).
Figure 6A:
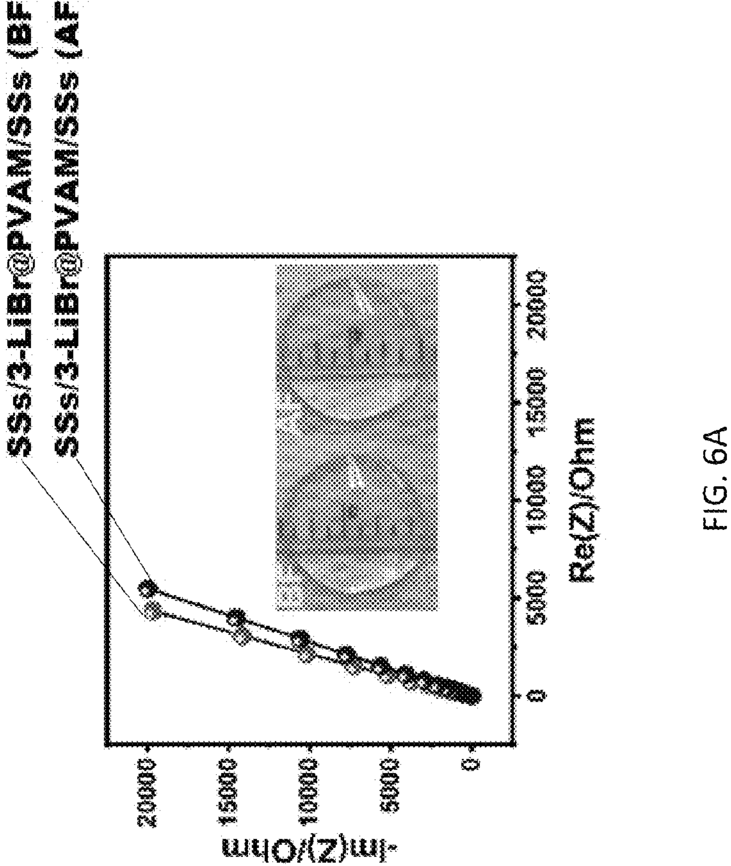
FIG. 6A is a graph showing the potential electrochemical impedance spectroscopy (PEIS) behavior of a two-electrode ion-blocking cell with two stainless steel strip (SSs) electrodes separated by an electrolyte comprising a polyvinyl alcohol (PVA) hydrogel prepared with a 3 molar (M) lithium bromide solution (SSs/3-LiBr@PVAM/SSs) before freezing (BF) and after freezing (AF). The inset shows photographic images of the electrolyte BF and AF.
Figures 6C, 6D:
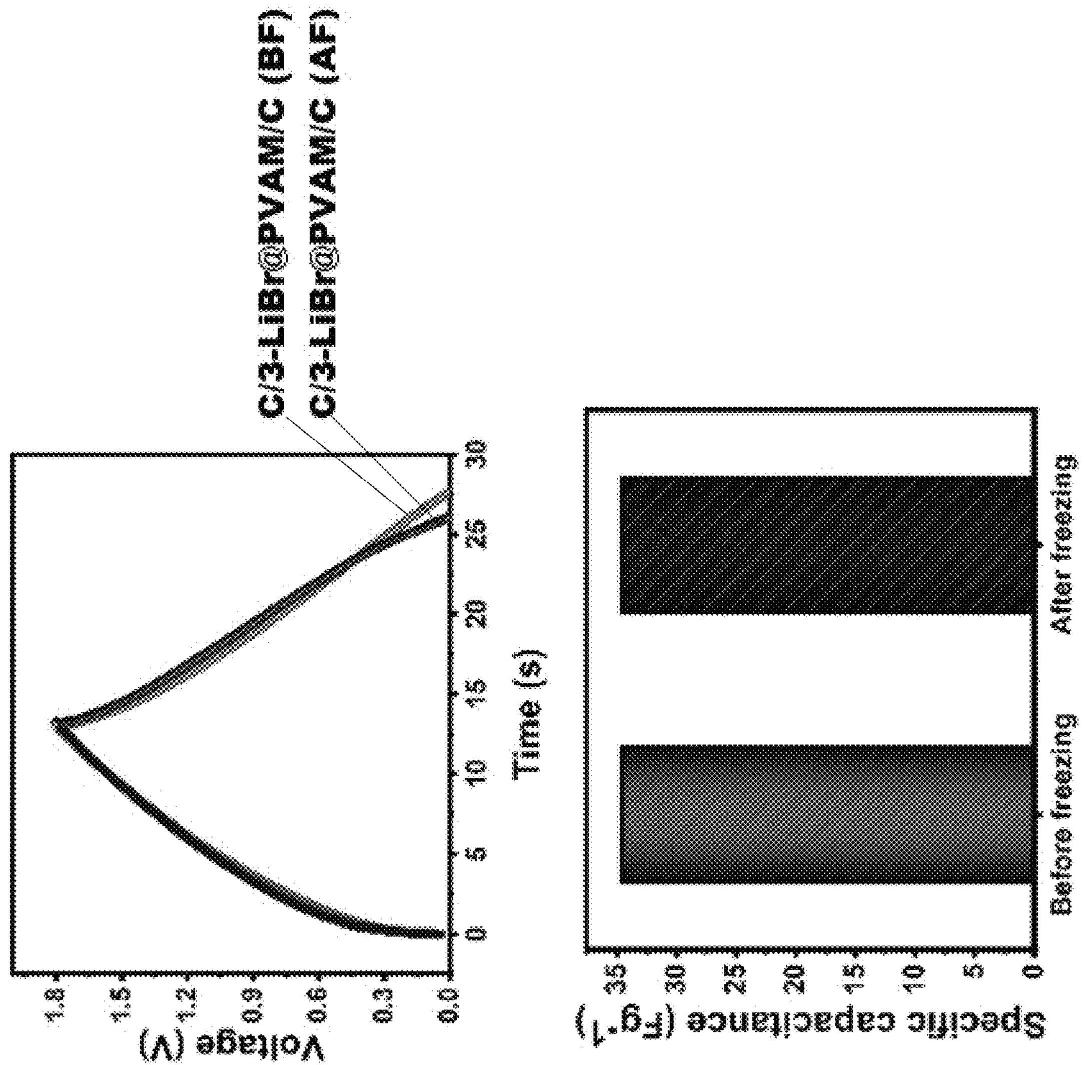
FIG. 6C is a graph showing the galvanostatic charge-discharge curves (GCDs, voltage (in volts (V)) versus time (in seconds (S))) of a two-electrode ion-blocking cell with two stainless steel strip (SSs) electrodes separated by an electrolyte comprising a polyvinyl alcohol (PVA) hydrogel prepared with a 3 molar (M) lithium bromide solution (SSs/3-LiBr@PVAM/SSs) before freezing (BF) and after freezing (AF).
FIG. 6D is a graph showing the specific capacitance of the cells described in FIG. 6C.
Figures 6E, 6F:
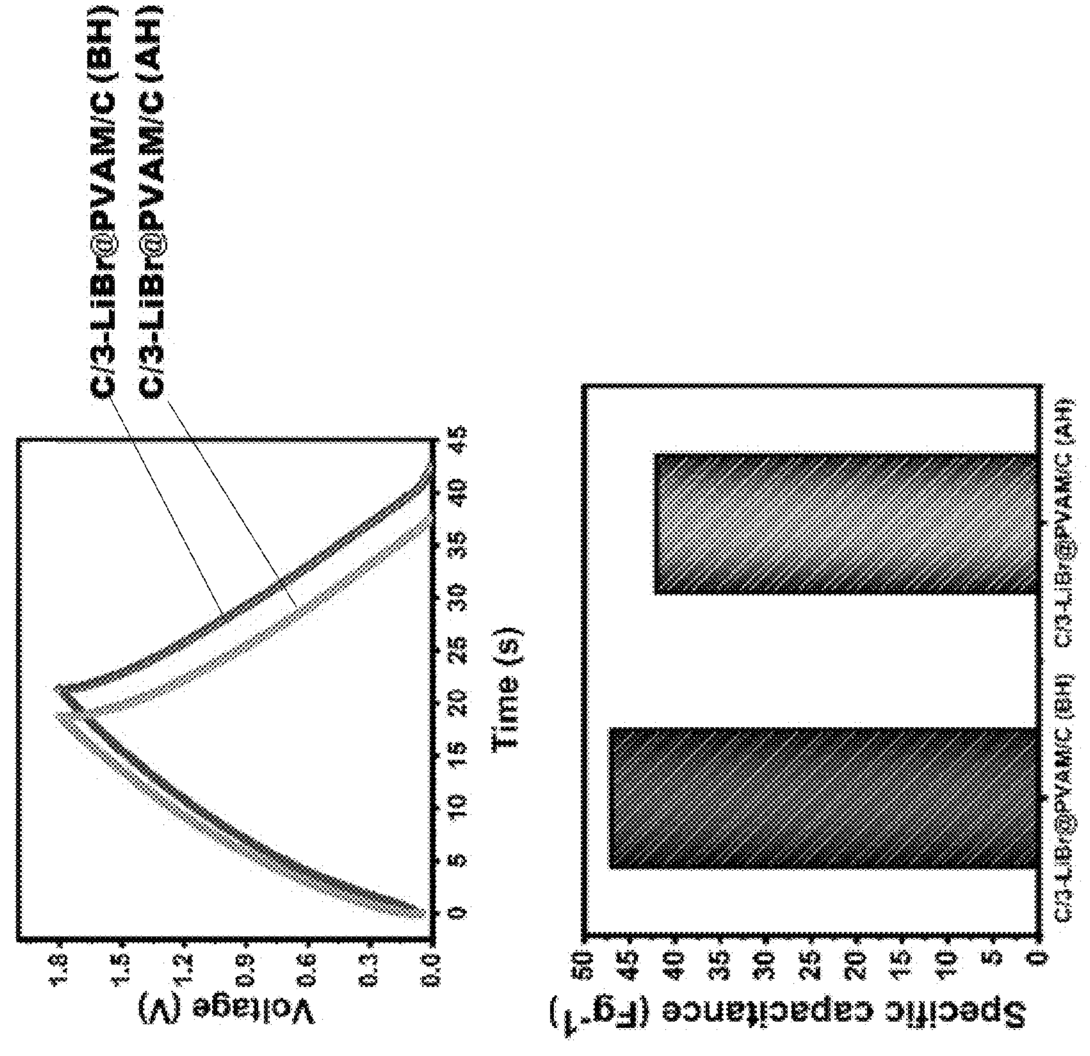
FIG. 6E is a graph showing the galvanostatic charge-discharge curves (GCDs, voltage (in volts (V)) versus time (in seconds (S))) of a two-electrode ion-blocking cell including two stainless steel strip (SSs) electrodes separated by an electrolyte comprising a polyvinyl alcohol (PVA) hydrogel prepared with a 3 molar (M) lithium bromide solution (SSs/3-LiBr@PVAM/SSs) before heating (BH) and after heating (AH).
FIG. 6F is a graph showing the specific capacitance of the devices described in FIG. 6E.

Conductivity Tests:

The ionic conductivity of the obtained hydrogel samples (X-LiBr@PVAM) was measured using potentioelectrochemical impedance spectroscopy technique (PEIS). In order to conduct the PEIS measurements, a two-electrode ion-blocking cell was used. The cell is composed of two stainless steel strip (SSs) electrodes separated by a fixed distance of ~1.8 mm. Different concentrations of the gel electrolytes were sandwiched between the SSs electrodes in a 1×1 cm2 area. See FIGS. 6A and 6B. A BioLogic potentiostat/galvanostat was used to perform the PEIS measurements at ambient temperature. The test was performed at open circuit voltage condition (OCV) over a frequency range of 1 Hz to 100 KHz with 5 mV amplitude. The ionic conductivity ($\sigma$) can be calculated as: $\sigma$=L/Ra, where L is the distance between the stainless-steel strips; the thickness of the used gel electrolyte in cm, a is the area of the electrode in $cm^2$, and R is the bulk resistance in Ω. GCD responses and specific capacitance of the two-electrode ion-blocking cells before and after heating and before and after freezing are shown in FIGS. 6C-6F.

REFERENCES

All references listed in the instant disclosure, including but not limited to all patents, patent applications and publications thereof, and scientific journal articles, are incorporated herein by reference in their entireties to the extent that they supplement, explain, provide a background for, and/or teach methodology, techniques, and/or compositions employed herein. No admission is made that any reference (or a portion of any reference) is relevant prior art. Applicants reserve the right to challenge the accuracy and pertinence of any cited reference.

1. Qin, W. et al. Mini-Review on the Redox Additives in Aqueous Electrolyte for High Performance Supercapacitors. *ACS Omega* 5, 3801-3808 (2020).
2. Hashemi, M. et al. The use of an electrocatalytic redox electrolyte for pushing the energy density boundary of a flexible polyaniline electrode to a new limit. *Nano Energy* 44, 489-498 (2018).
3. El Sharkawy, H. M. et al. N-doped carbon quantum dots boost the electrochemical supercapacitive performance and cyclic stability of MoS2. *J. Energy Storage* 27, 101078 (2020).
4. Shao, Y. et al. Graphene-based materials for flexible supercapacitors. *Chem. Soc. Rev.* 44, 3639-3665 (2015).
5. Simon, P., Gogotsi, Y. & Dunn, B. Where do batteries end and supercapacitors begin? *Science* 343, 1210-1211 (2014).
6. Zhang, L. et al. A Review of Redox Electrolytes for Supercapacitors. *Front. Chem.* 8, 1-7 (2020).
7. Ye, W., Wang, H., Ning, J., Zhong, Y. & Hu, Y. New types of hybrid electrolytes for supercapacitors. *J. Energy Chem.* 57, 219-232 (2021).
8. Zhong, C. et al. A review of electrolyte materials and compositions for electrochemical supercapacitors. *Chem. Soc. Rev.* 44, 7484-7539 (2015).
9. Pal, B., Yang, S., Ramesh, S., Thangadurai, V. & Jose, R. Electrolyte selection for supercapacitive devices: A critical review. *Nanoscale Adv.* 1, 3807-3835 (2019).
10. Zhou, D. et al. Biomimetic Extreme-Temperature- and Environment-Adaptable Hydrogels. *ChemPhysChem* 20, 2139-2154 (2019).
11. Yuk, H., Zhang, T., Parada, G. A., Liu, X. & Zhao, X. Skin-inspired hydrogel-elastomer hybrids with robust interfaces and functional microstructures. *Nat. Commun.* 7, 1-11 (2016).
12. Wang, Z. et al. All-climate aqueous fiber-shaped supercapacitors with record areal energy density and high safety. *Nano Energy* 50, 106-117 (2018).
13. Ge, W., Cao, S., Yang, Y., Rojas, O. J. & Wang, X. Nanocellulose/LiCl systems enable conductive and stretchable electrolyte hydrogels with tolerance to dehydration and extreme cold conditions. *Chem. Eng. J.* 408, 127306 (2021).
14. Chen, F. et al. Rational fabrication of anti-freezing, non-drying tough organohydrogels by one-pot solvent displacement. *Angew. Chemie* 130, 6678-6681 (2018).
15. Miller, J. R. & Simon, P. Electrochemical capacitors for energy management. *Science* 321, 651-652 (2008).
16. Miller, J. R. & Burke, A. Electrochemical capacitors: challenges and opportunities for real-world applications. *Electrochem. Soc. interface* 17, 53 (2008).
17. Lu, M. *Supercapacitors: Materials, systems, and applications*. (John Wiley & Sons, 2013).
18. Fic, K., Frackowiak, E. & Béguin, F. Unusual energy enhancement in carbon-based electrochemical capacitors. *J. Mater. Chem.* 22, 24213-24223 (2012).
19. Senthilkumar, S. T., Selvan, R. K. & Melo, J. S. Redox additive/active electrolytes: a novel approach to enhance the performance of supercapacitors. *J. Mater. Chem. A* 1, 12386-12394 (2013).
20. Frackowiak, E., Fic, K., Meller, M. & Lota, G. Electrochemistry serving people and nature: High-energy ecocapacitors based on redox-active electrolytes. *ChemSusChem* 5, 1181-1185 (2012).
21. Su, L., Gong, L., Lü, H. & Xü, Q. Enhanced low-temperature capacitance of $MnO_2$ nanorods in a redox-active electrolyte. *J. Power Sources* 248, 212-217 (2014).
22. Su, L., Gong, L. & Zhao, Y. A new strategy to enhance low-temperature capacitance: a combination of two charge-storage mechanisms. *Phys. Chem. Chem. Phys.* 16, 681-684 (2014).
23. Abbas, Q., Ratajczak, P. & Béguin, F. Sodium molybdate—an additive of choice for enhancing the performance of AC/AC electrochemical capacitors in a salt aqueous electrolyte. *Faraday Discuss.* 172, 199-214 (2014).
24. Qian, X. et al. Methods to study the ionic conductivity of polymeric electrolytes using a.c. impedance spectroscopy. *J. Solid State Electrochem.* 6, 8-15 (2001).
25. Tran, V. C., Sahoo, S., Hwang, J., Nguyen, V. Q. & Shim, J. J. Poly(aniline-co-pyrrole)-spaced graphene aerogel for advanced supercapacitor electrodes. *J. Electroanal. Chem.* 810, 154-160 (2018).

26. Ali, A. et al. 3D NiO nanowires@NiO nanosheets core-shell structures grown on nickel foam for high-performance supercapacitor electrode. *J. Electroanal. Chem.* 857, 113710 (2020).

27. Shen, C. et al. Applied Surface Science Rational design of activated carbon nitride materials for symmetric supercapacitor applications. *Appl. Surf. Sci.* 455, 841-848 (2018).

28. Ali, B. A., Omar, A. M. A., Khalil, A. S. G. & Allam, N. K. Untapped Potential of Polymorph MoS2: Tuned Cationic Intercalation for High-Performance Symmetric Supercapacitors. *ACS Appl. Mater. Interfaces* 11, 33955-33965 (2019).

29. Gong, W. et al. Improved supercapacitors by implanting ultra-long single-walled carbon nanotubes into manganese oxide domains. *J. Power Sources* 479, 228795 (2020).

30. Barba, M. I., Karachi, M. S. & Coronas, A. Quantitative analysis of the hydration of lithium salts in water using multivariate curve resolution of near-infrared spectra. *Anal. Chim. Acta* 919, 20-27 (2016).

31. Sui, X. et al. Ionic conductive hydrogels with long-lasting antifreezing, water retention, and self-regeneration abilities. *Chem. Eng. J.* 419, 129478 (2021).

32. Wang, Z., Orejon, D., Sefiane, K. & Takata, Y. Water vapor uptake into hygroscopic lithium bromide desiccant droplets: Mechanisms of droplet growth and spreading. *Phys. Chem. Chem. Phys.* 21, 1046-1058 (2019).

33. Ma, J. & Persson, I. A Study of the Hydration of the Alkali Metal Ions in Aqueous Solution. *Inorg. Chem.* 51, 425-438 (2012).

34. Jipa, I. M. et al. Potassium sorbate release from poly (vinyl alcohol)-bacterial cellulose films. *Chem. Pap.* 66, 138-143 (2012).

35. Li, Q. et al. Redox enhanced energy storage in an aqueous high-voltage electrochemical capacitor with a potassium bromide electrolyte. *J. Power Sources* 348, 219-228 (2017).

36. Fic, K., Morimoto, S., Frackowiak, E. & Ishikawa, M. Redox Activity of Bromides in Carbon-Based Electrochemical Capacitors. *Batter. Supercaps* 3, 1080-1090 (2020).

37. Ghanem, L. G., Shaheen, B. S. & Allam, N. K. 'Salt-in-Fiber' Electrolyte Enables High-Voltage Solid-State Supercapacitors. *ACS Appl. Energy Mater.* 5, 6410-6416 (2022).

38. Chen, L., Bai, H., Huang, Z. & Li, L. Mechanism investigation and suppression of self-discharge in active electrolyte enhanced supercapacitors. *Energy Environ. Sci.* 7, 1750-1759 (2014).

39. Wi, S. M. et al. A redox-mediator-integrated flexible micro-supercapacitor with improved energy storage capability and suppressed self-discharge rate. *Nanomaterials* 11, 3027, (2021).

40. Zhao, J. et al. A self-healing hydrogel electrolyte for flexible solid-state supercapacitors. *Chem. Eng. J.* 401, 125456 (2020).

41. Wang, Q. et al. Three-dimensional flower-like and hierarchical porous carbon materials as high-rate performance electrodes for supercapacitors. *Carbon* 67, 119-127 (2014).

42. Li, M., Tang, Z., Leng, M. & Xue, J. Flexible solid-state supercapacitor based on graphene-based hybrid films. *Adv. Funct. Mater.* 24, 7495-7502 (2014).

43. Huang, H. et al. A Powder Self-Healable Hydrogel Electrolyte for Flexible Hybrid Supercapacitors with High Energy Density and Sustainability. *Small* 17, 2006807 (2021).

44. Li, W., Gao, F., Wang, X., Zhang, N. & Ma, M. Strong and Robust Polyaniline-Based Supramolecular Hydrogels for Flexible Supercapacitors. *Angew. Chemie* 128, 9342-9347 (2016).

45. Wang, G. et al. Solid-state supercapacitor based on activated carbon cloths exhibits excellent rate capability. *Adv. Mater.* 26, 2676-2682 (2014).

46. Wang, P. et al. Superhydrophobic Flexible Supercapacitors Formed by Integrating Hydrogel with Functional Carbon Nanomaterials. *Chinese J. Chem.* 39, 1153-1158 (2021).

47. Chodankar et al., *J. Colloid and Interface Science* 460, 370-376 (2015).

48. Yu et al., *Electrochimica Acta* 56(20), 6881-6886 (2011).

49. Sun et al. *RSC Advances* 5, 22419-22425 (2015).

50. Wang et al., *Adv. Mater.* 27(45), 7451-7457 (2015).

51. Mallakpaur et al., *Polymer* 81, 140-150 (2015).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A hydrogel electrolyte comprising a polymeric matrix and a solution comprising water and a salt, wherein the polymeric matrix comprises polyvinyl alcohol (PVA) and wherein the salt comprises lithium bromide (LiBr), wherein the hydrogel electrolyte comprises (i) about 2 parts of an aqueous solution of LiBr having a LiBr concentration of about 0.5 M to about 5 M and (ii) about one part of an aqueous solution comprising about 0.15 grams per milliliter (g/mL) PVA, the hydrogel electrolyte is capable of regenerating, via absorption of water from an environment surrounding the hydrogel electrolyte and within twenty-four hours, more than 70% of a water content of the hydrogel electrolyte following loss of the water content due to evaporation, and the hydrogel electrolyte is intrinsically redox active.

2. The hydrogel electrolyte of claim 1, wherein the hydrogel electrolyte remains unfrozen at a temperature below 0 degrees Celsius (C), optionally wherein the hydrogel remains unfrozen to a temperature as low as about −30° C.

3. The hydrogel electrolyte of claim 1, wherein the hydrogel electrolyte has an ionic conductivity of about 95 milliSiemens per centimeter ($mS \cdot cm^{-1}$).

4. A method of preparing a hydrogel electrolyte, wherein the method comprises:

(i) preparing a first solution, wherein the first solution comprises an aqueous solution of polyvinyl alcohol (PVA), wherein the first solution comprises about 0.15 grams of PVA per milliliter;

(ii) preparing a second solution, wherein the second solution comprises an aqueous solution of lithium bromide (LiBr), wherein the second solution has a concentration of LiBr of about 0.5 molar (M) to about 5 M; and adding a volume of the first solution to a volume of the second solution to provide a mixture and stirring the mixture for a period of time to provide a clear composition, thereby providing the hydrogel electrolyte, wherein a volume ratio of the first solution to the second solution is about 2:1, the hydrogel electrolyte is capable of regenerating, via absorption of water from an environment surrounding the hydrogel electrolyte and within twenty-four hours, more than 70% of a water content of the hydrogel electrolyte following loss of the water content due to evaporation, and the hydrogel electrolyte is intrinsically redox active.

5. The method of claim 4, wherein preparing the first solution comprises adding PVA to deionized water to provide a PVA mixture and stirring the PVA mixture at an elevated temperature, optionally at a temperature of about 80 degrees Celsius (° C.), for a period of time until the PVA mixture becomes clear.

6. The hydrogel electrolyte prepared by a method of claim 4, wherein said hydrogel electrolyte is non-flammable and remains unfrozen at a temperature of about −30° C.

7. A device comprising the hydrogel electrolyte of claim 6, wherein intrinsic redox activity of the device increases a capacitance of the device.

8. The device of claim 7, wherein the device is selected from a battery, a capacitor, a supercapacitor, and an optoelectronic device.

9. An energy storage device comprising:

(a) a cathode;

(b) an anode; and (c) the hydrogel electrolyte of claim 6 disposed between the anode and the cathode, wherein intrinsic redox activity of the energy storage device increases a capacitance of the energy storage device.

10. The energy storage device of claim 9, wherein the cathode and/or the anode comprises activated carbon and/or graphite.

11. The energy storage device of claim 9, wherein the energy storage device has an operating potential window of about 1.8 volts (V).

12. The energy storage device of claim 9, wherein the energy storage device has a specific capacitance of up to about 63.3 F/g.

13. The energy storage device of claim 9, wherein the energy storage device has an energy density of about 20.5 Wh/kg and/or a power density of about 3430 W/kg.

14. The energy storage device of claim 9, wherein during a self-discharge test, the energy storage device takes more than 10,800 seconds to drop from about 1.8 V to about 0.3 V.

15. The device of claim 8 wherein the device comprises the battery.

16. The energy storage device of claim 9 comprising a battery including the anode, the cathode and the hydrogel electrolyte.

* * * * *